US012179348B2

(12) United States Patent
Sadick et al.

(10) Patent No.: US 12,179,348 B2
(45) Date of Patent: Dec. 31, 2024

(54) BI-DIRECTIONAL ROBOTIC CRAWLER FOR TRANSPORTING A SENSOR SYSTEM ABOUT A STRUCTURE

(71) Applicant: Honeybee Robotics, LLC, Longmont, CO (US)

(72) Inventors: Shazad Sadick, Franklin Square, NY (US); Jack Wilson, Brooklyn, NY (US); Jonathan Bohren, Brooklyn, NY (US)

(73) Assignee: Honeybee Robotics, LLC, Longmont, CO (US)

( * ) Notice: Subject to any disclaimer, the term of this patent is extended or adjusted under 35 U.S.C. 154(b) by 0 days.

(21) Appl. No.: 18/499,645

(22) Filed: Nov. 1, 2023

(65) Prior Publication Data

US 2024/0066682 A1 Feb. 29, 2024

Related U.S. Application Data

(63) Continuation of application No. 16/983,025, filed on Aug. 3, 2020, now Pat. No. 11,833,674.

(Continued)

(51) Int. Cl.
*B25J 5/00* (2006.01)
*B25J 9/00* (2006.01)
*B25J 9/10* (2006.01)

(52) U.S. Cl.
CPC ............... *B25J 5/005* (2013.01); *B25J 5/007* (2013.01); *B25J 9/0009* (2013.01); *B25J 9/102* (2013.01)

(58) Field of Classification Search
CPC ............. B25J 5/005; B25J 5/07; B25J 9/0009

(Continued)

(56) References Cited

U.S. PATENT DOCUMENTS 4,223,753 A 9/1980 Bradbury
4,995,320 A 2/1991 Sato et al.
(Continued)

FOREIGN PATENT DOCUMENTS

CN 105643412 A 6/2016
GB 957180 A 5/1964
(Continued)

OTHER PUBLICATIONS

Choi et al., Inch-Worm Robot with Automatic Pipe Tracking Capability for the Feeder Pipe Inspection of a PHWR. Journal of Institute of Control, Robotics and Systems. Feb. 2008;14(2):125-140.

(Continued)

*Primary Examiner* — T. Scott Fix
(74) *Attorney, Agent, or Firm* — McCarter & English, LLP; Dave S. Christensen

(57) ABSTRACT

A bi-directional robotic crawler includes a first drive system having a first drive member, a second drive member, and a support member. The first drive member includes a first pair of wheels and the second drive member includes a second pair of wheels. A second drive system includes a third drive member and a fourth drive member. The third drive member includes a first drive element and the fourth drive member includes a second drive element. A linking member selectively pivots the third drive member and the fourth drive member relative to the support member. A motor is mounted to the first drive system. The motor selectively operates the first and second pairs of wheels to move the bi-directional robotic crawler along a first axis and the first and second drive elements to move the bi-directional robotic crawler along a second axis.

16 Claims, 15 Drawing Sheets

Related U.S. Application Data

(60) Provisional application No. 62/886,482, filed on Aug. 14, 2019.

(58) Field of Classification Search
USPC .................................................. 180/9; 901/1
See application file for complete search history.

(56) References Cited

U.S. PATENT DOCUMENTS

| | | | |
|---|---|---|---|
| 5,186,270 | A | 2/1993 | West |
| 5,736,821 | A | 4/1998 | Suyama |
| 5,868,600 | A | 2/1999 | Watanabe |
| 6,726,524 | B2 | 4/2004 | Yamaguchi et al. |
| 7,256,559 | B2 | 8/2007 | Zhang |
| 7,594,448 | B2 | 9/2009 | Jacobson et al. |
| 7,656,997 | B1 | 2/2010 | Anjelly |
| 8,041,517 | B2 | 10/2011 | Thayer et al. |
| 8,141,442 | B2 | 3/2012 | Roberts |
| 8,185,241 | B2 | 5/2012 | Jacobsen |
| 8,605,145 | B2 | 12/2013 | Webster et al. |
| 8,619,134 | B2 | 12/2013 | Christ |
| 9,056,746 | B2 | 6/2015 | Mehrandezh et al. |
| 9,096,281 | B1 | 8/2015 | Li et al. |
| 9,360,311 | B2 | 6/2016 | Gonzalez et al. |
| 9,389,150 | B2 | 7/2016 | Kimpel, Jr. et al. |
| 9,616,948 | B2 | 4/2017 | Ben-Tzvi et al. |
| 9,632,504 | B1 | 4/2017 | Watts |
| 9,724,789 | B2 | 8/2017 | Matthews et al. |
| 9,758,133 | B2 | 9/2017 | Mistrot et al. |
| 9,789,605 | B2 | 10/2017 | Meier et al. |
| 9,863,919 | B2 | 1/2018 | Carrasco Zanini et al. |
| 11,833,674 | B2 | 12/2023 | Sadick et al. |
| 2006/0290779 | A1 | 12/2006 | Reverte et al. |
| 2008/0068601 | A1 | 3/2008 | Thayer et al. |
| 2010/0131210 | A1 | 5/2010 | Fingerhut et al. |
| 2014/0156067 | A1 | 6/2014 | An et al. |
| 2015/0350506 | A1 | 12/2015 | Olsson et al. |
| 2016/0059939 | A1 | 3/2016 | Lamonby et al. |
| 2016/0188977 | A1 | 6/2016 | Kearns et al. |
| 2016/0320266 | A1 | 11/2016 | Kimpel, Jr. et al. |
| 2017/0131214 | A1 | 5/2017 | Gutiérrez Pérez et al. |
| 2017/0278587 | A1 | 9/2017 | Futin et al. |
| 2018/0080905 | A1 | 3/2018 | Al Nahwi et al. |
| 2018/0149622 | A1 | 5/2018 | Vieau et al. |
| 2019/0016367 | A1 | 1/2019 | Dobell et al. |
| 2020/0225170 | A1 | 7/2020 | Bohren et al. |

FOREIGN PATENT DOCUMENTS

| | | |
|---|---|---|
| GB | 2551609 A | 12/2017 |
| JP | 2533027 | 6/1996 |
| WO | WO-1986/06696 A1 | 11/1986 |
| WO | WO-2002/46031 A1 | 6/2002 |

OTHER PUBLICATIONS

Ibarguren et al., Thermal Tracking in Mobile Robots for Leak Inspection Activities. Sensors. 2013;13:13560-13574.

Jiang et al., Autonomous robotic monitoring of underground cable systems. ICAR'05. Proceedings., 12th International Conference on Advanced Robotics, IEEE. pp. 673-679, (2005).

Kania. Automated Inspection of External Pipeline Corrosion With Laser-Based Pipeline Inspection Tool. 2000 3rd International Pipeline Conference. American Society of Mechanical Engineers, ASME. IPC2000-195, 2000;2:809-815.

Martinez-Gomez et al., A Taxonomy of Vision Systems for Ground Mobile Robots. Int J Adv Robot Syst. 2014;11(1111):1-26. 2014.

Murtra et al., IMU and Cable Encoder Data Fusion for In-Pipe Mobile Robot Localization. 2013 IEEE Conference on Technologies for Practical Robot Applications (TePRA). 6 pages, Aug. 22-23, 2018.

Singh et al., A Compact and Compliant External Pipe-crawling Robot. IEEE Transactions on Robotics. Feb. 2013;29(1):251-260.

Tache et al., Adapted magnetic wheel unit for compact robots inspecting complex shaped pipe structures. 2007 IEEE/ASME International Conference on Advanced Intelligent Mechatronics, IEEE. 6 pages, (2007).

Tadakuma et al., Crawler mechanism with circular section to realize a sideling motion. Proceedings of the 2008 IEEE International Conference on Intelligent Robots and Systems. 6 pages, Feb. 23, 2008.

International Search Report and Written Opinion for Application No. PCT/US2019/062937, dated Nov. 25, 2019, 17 pages.

BI-DIRECTIONAL ROBOTIC CRAWLER FOR TRANSPORTING A SENSOR SYSTEM ABOUT A STRUCTURE

CROSS-REFERENCE TO RELATED APPLICATIONS

This application is a continuation application of U.S. patent application Ser. No. 16/983,025 filed on Aug. 3, 2020, which claimed the benefit of an earlier filing date from U.S. Provisional Application Ser. No. 62/886,482 filed Aug. 14, 2019, the entire disclosure of which is incorporated herein by reference.

INTRODUCTION

The subject disclosure relates to the art of crawlers and, more particularly, to a bi-directional robotic crawler for transporting a sensor system about a structure.

From time to time it may be desirable to inspect a structure such as a bridge, an oil platform, pipes and the like. The inspection may reveal a need for maintenance in one or more areas of the structure. Structures may be difficult for people to access or traverse and thus robotic conveyance systems may be employed to collect sensor data for inspection purposes. One drawback with current systems is a lack of knowledge of a specific location of the data collected by the robotic conveyance system relative to the structure. Pinpointing the location of the sensor data on the structure is helpful in reporting an area than may benefit from maintenance.

Another drawback is difficulty in traversing surfaces having curvilinear shapes such as pipes. Moving along and detecting aspects of all surface areas of a pipe can be difficult, particularly when the pipe may include various valves, branches and the like. Accordingly, it is desirable to provide a robotic conveyance system or crawler that may traverse various structures while carrying a sensor package that may communicate a precise location of sensed parameters to an operator.

SUMMARY

Disclosed is a bi-directional robotic crawler including a first drive system having a first drive member, a second drive member, and a support member extending therebetween. The first drive member includes a first pair of wheels and the second drive member includes a second pair of wheels. The first pair of wheels and the second pair of wheels being rotatable to shift the bi-directional robotic crawler along a first axis. A second drive system is mounted to the first drive system. The second drive system includes a third drive member arranged between the first and second drive members on a first side of the support member, and a fourth drive member arranged between the first and second drive members on a second, opposing side of the support member. The third drive member includes a first drive element and the fourth drive member includes a second drive element. The first drive element and the second drive element being rotatable to shift the bi-directional robotic crawler along a second axis that is angled relative to the first axis. A linking member is connected to the third drive member and the fourth drive member across the support member. The linking member selectively pivots the third drive member and the fourth drive member relative to the support member. A motor is mounted to the first drive system. The motor selectively operates the first pair of wheels and the second pair of wheels to move the bi-directional robotic crawler along the first axis and the first drive element and the second drive element to move the bi-directional robotic crawler along the second axis.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
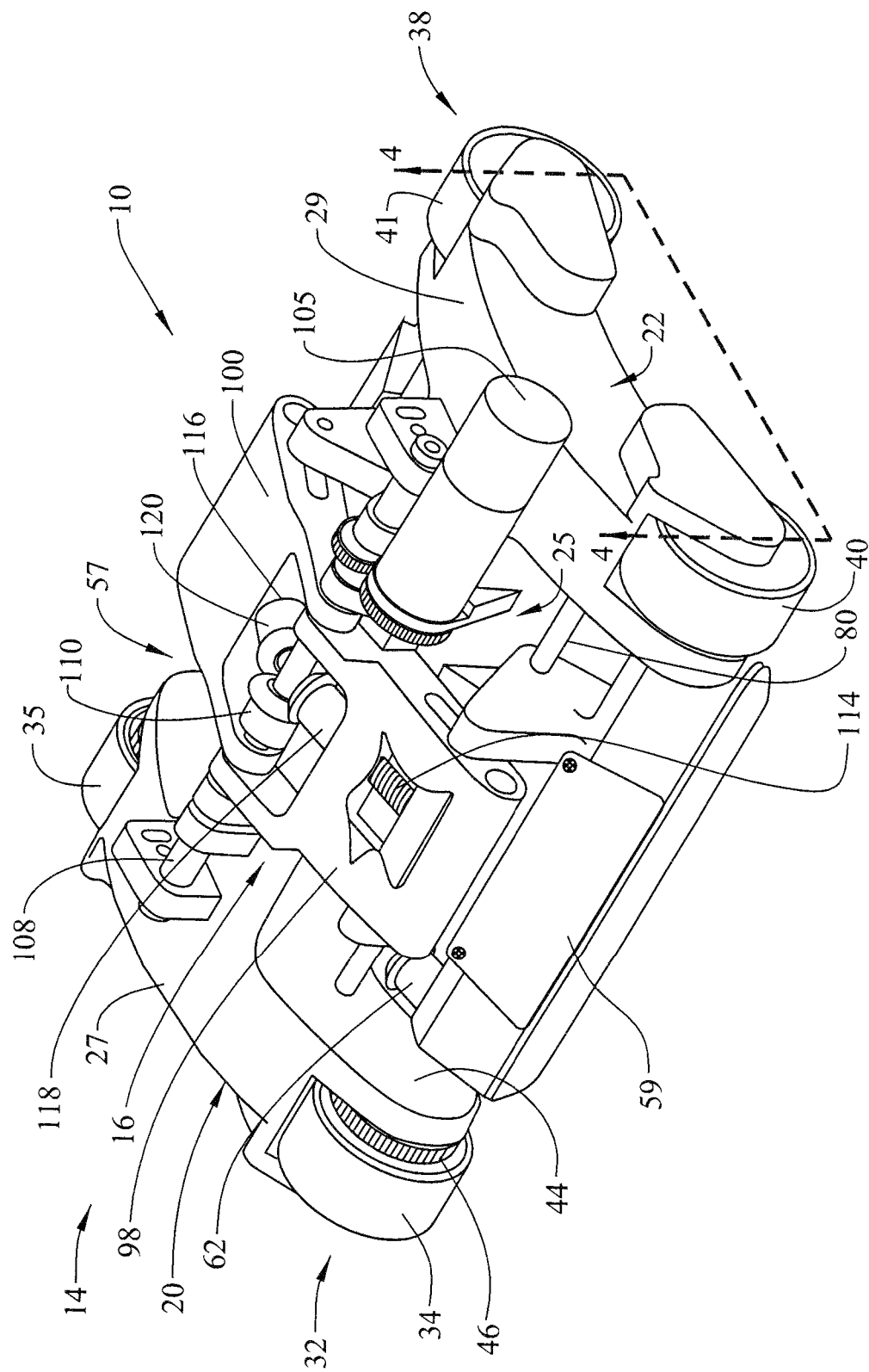
FIG. 1 is an upper right perspective view of a bi-directional robotic crawler, in accordance with an aspect of an exemplary embodiment.
Figure 2:
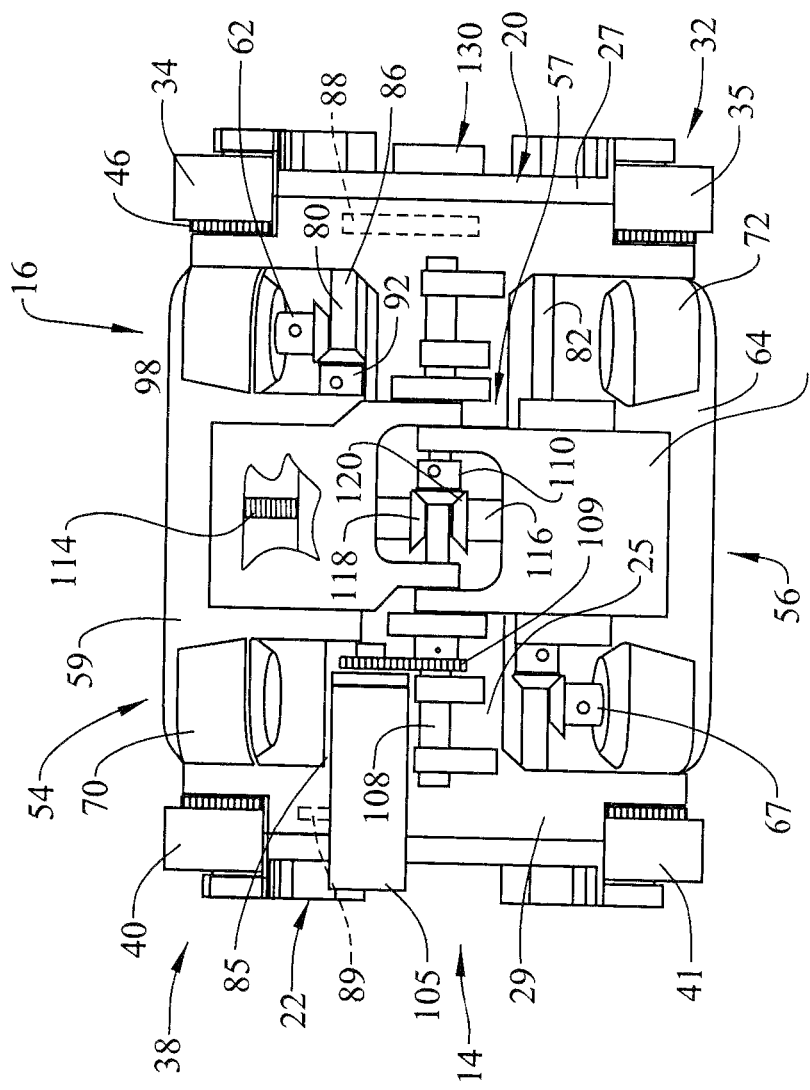
FIG. 2 is a top view of the bi-directional robotic crawler, in accordance with an aspect of an exemplary embodiment.
Figure 3:
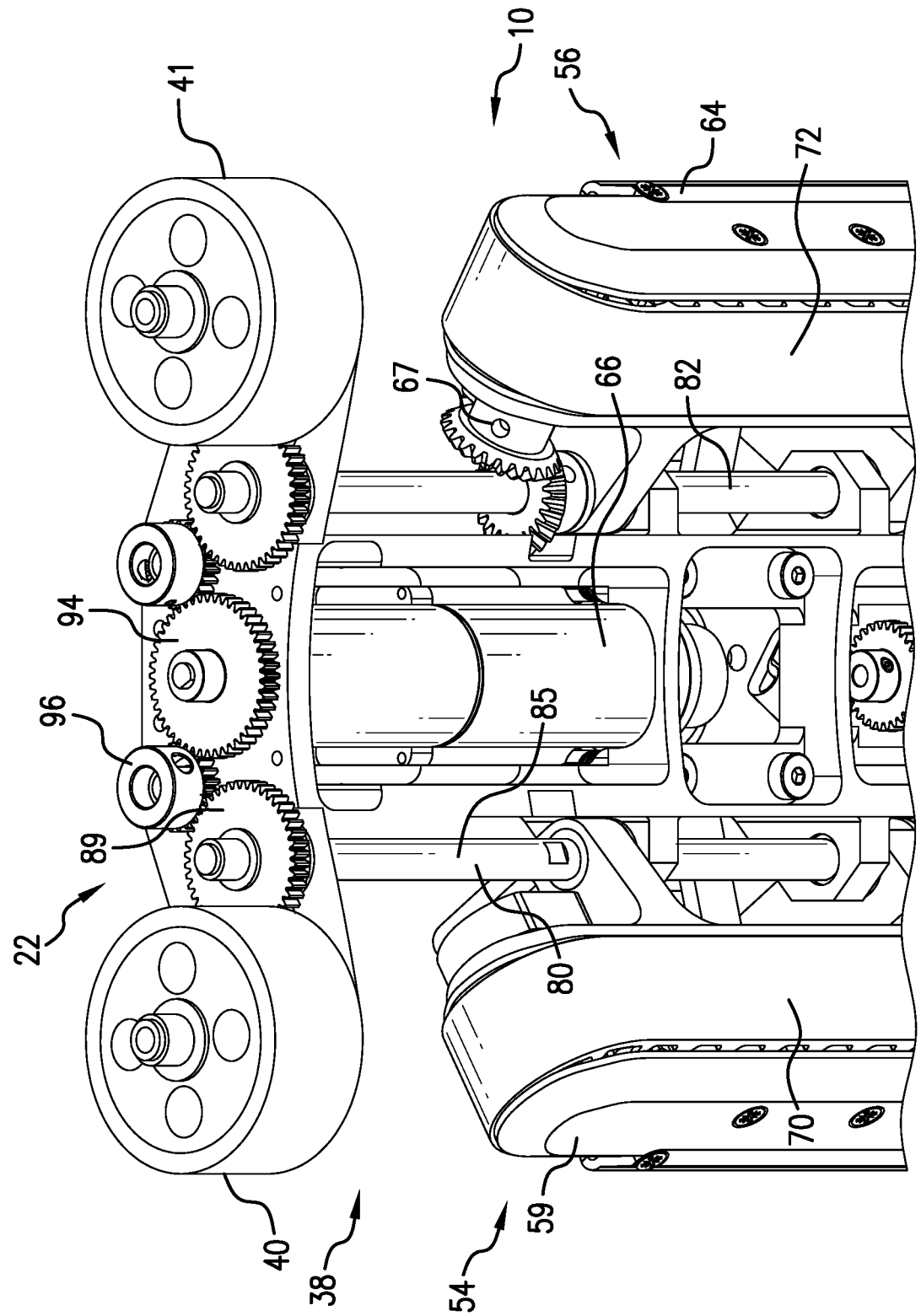
FIG. 3 depicts an underside view of the bi-directional robotic crawler of FIG. 1, in accordance with an exemplary aspect.
Figure 4:
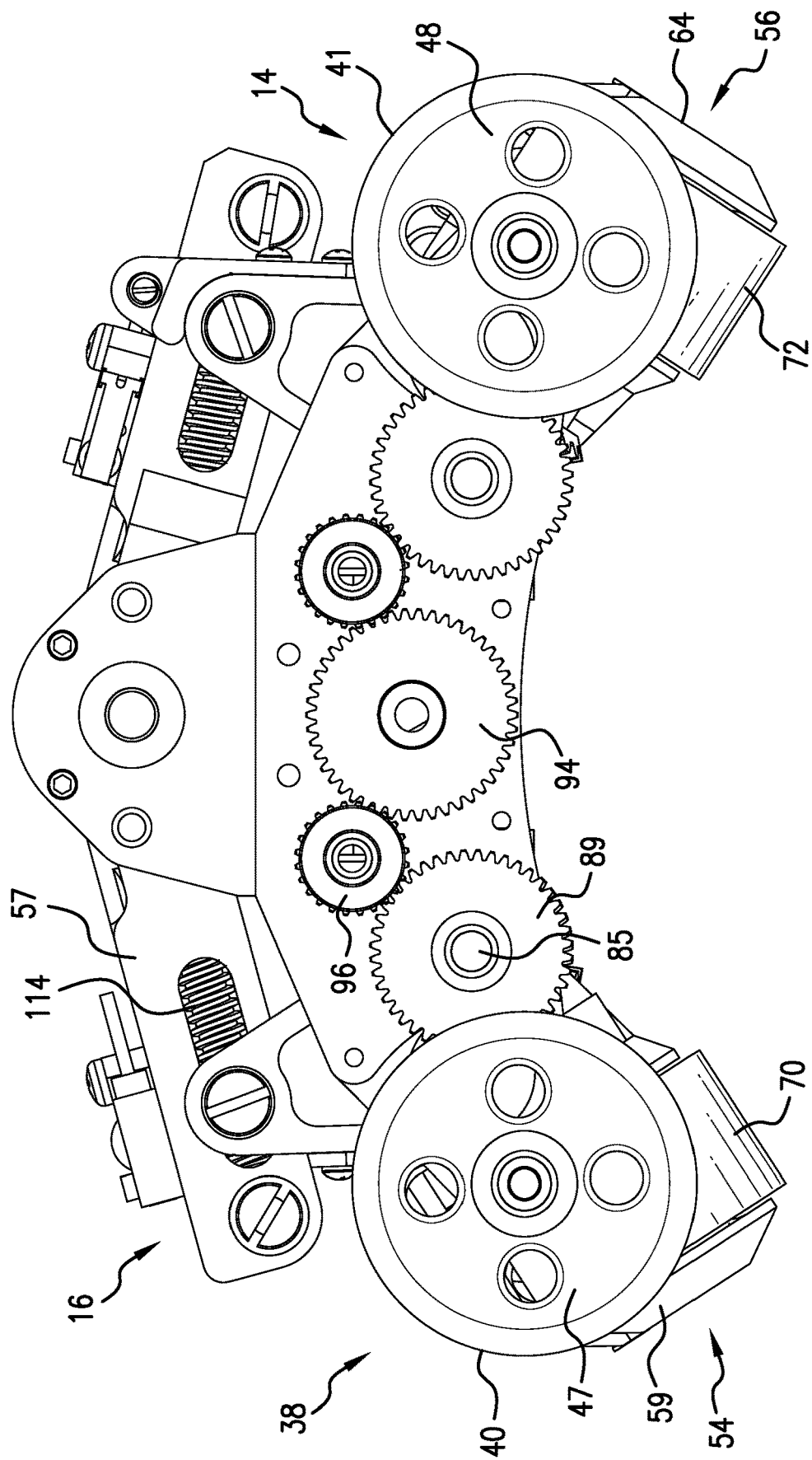
FIG. 4 depicts a partial cross-sectional view taken through the line 4-4 in FIG. 1, in accordance with an aspect of an exemplary embodiment.

The following description is merely exemplary in nature and is not intended to limit the present disclosure, its application or uses. It should be understood that throughout the drawings, corresponding reference numerals indicate like or corresponding parts and features. As used herein, the term module refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

A bi-directional robotic crawler, in accordance with an exemplary embodiment, is indicated generally at 10 in FIGS. 1-4. Bi-directional robotic crawler 10 includes a first drive system 14 operatively connected to a second drive system 16. First drive system 14 operates to move bi-directional robotic crawler 10 in a first direction and second drive system 16 operates to move bi-directional robotic crawler 10 in a second direction. In an embodiment, the second direction is substantially perpendicular to the first direction.

In accordance with an exemplary embodiment, first drive system 14 includes a first drive member 20 and a second drive member 22 separated by a support member 25. First drive member 20 includes a first housing 27 and second drive member 22 includes a second housing 29. First housing 27 supports a first pair of wheels 32 including a first wheel 34 and a second wheel 35. Second housing 29 supports a second pair of wheels 38 including a third wheel 40 and a fourth wheel 41. It should be understood that the number, and size of each of the first, second, third, and fourth wheels 34, 35, 40 and 41 may vary. Further, it should be understood that each wheel 34, 35, 40 and 41 may be formed from a material suitable to contact with high temperature surfaces. That is, wheels 34, 35, 40 and 41 may be formed from silicon rubber. Each of the first and second pairs of wheels 32 and 38 includes a corresponding axle, one of which is shown at 44 on first wheel 34 and a corresponding gear element, such as shown at 46 on first wheel 34, at 47 on third wheel 40, and at 48 on fourth wheel 41.

In further accordance with an exemplary embodiment, second drive system 16 includes a third drive member 54 arranged between first drive member 20 and second drive member 22 on a first side of support member 25 and a fourth drive member 56 arranged between first drive member 20 and second drive member 22 on a second, opposing side of support member 25. Third drive member 54 is operatively connected to fourth drive member 56 through a linking member 57 as will be detailed herein. Third drive member 54 includes a first drive element 59 including a first gear member 62. Fourth drive member 56 includes a second drive element 64 including a second gear member 67.

In accordance with an exemplary aspect, third drive member 54 includes a first continuous belt 70 and fourth drive member 56 includes a second continuous belt 72. It should be understood that each continuous belt 70 and 72 may be formed from a material suitable to contact with high temperature surfaces. That is, continuous belts 70 and 72 may be formed from silicon rubber. It should be further understood, that third and fourth drive members 54 and 56 may, in the alternative, take the form of wheels. As will be detailed herein, a drive motor 66 is operatively connected to first drive system 14 and second drive system 16

In further accordance with an exemplary embodiment, bi-directional robotic crawler 10 includes a first axle 80 extending between first drive member 20 and second drive member 22 on the first side of support member 25 and a second axle 82 extend between first drive member 20 and second drive member 22 on the second side of support member 25. As each axle 80 and 82 is substantially similar, a detailed description will follow to first axle 80 with an understanding that second axle 82 includes similar structure.

First axle 80 includes a first end 85, a second end 86 and an intermediate portion (not separately labeled) extending therebetween. First end 85 supports a first gear element 88 and second end 86 supports a second gear element 89. In an embodiment, first gear element 88 is operatively connected to first wheel 34 through, for example, gear element 46. Second gear element 89 is operatively connected to third wheel 40 through gear element 47. In an embodiment, first gear element 88 is arranged in first housing 27 and second gear element 89 is arranged in second housing 29. A gear 92 is arranged on the intermediate portion of first axle 80.

Gear 92 interfaces with first gear member 62. Drive motor 66 includes a drive gear 94 that is operatively connected to second gear element 89 through an idler gear 96. With this arrangement, drive motor 66 provides motive force to first wheel 34 and third wheel 40 as well as first drive element 59 via gear 92. Drive motor 66 is connected to second wheel 35, fourth wheel 41 and second drive element 64 in a similar manner. Drive motor 66 may be powered by an on-board power supply, such as a battery (not shown) arranged in an explosion proof battery housing also not shown. In another embodiment, drive motor 66 may receive power through a wired connection or tether (not shown).

In still further accordance with an exemplary embodiment, linking member 57 includes a first linking portion 98 coupled to third drive member 54 and a second linking portion 100 coupled to fourth drive member 56. First and second linking portions 98 and 100 are also connected to support member 25 and a directional change motor 105 through a drive shaft 108. Drive shaft 108 includes a first gear 109 coupled to directional change motor 105 and a directional change gear 110. Directional change motor 105 may be coupled to the on-board power supply or tethered connection in a manner similar to drive motor 66.

In an embodiment, first linking portion 98 includes a first actuator 114 and second linking portion 100 includes a second actuator 116. First actuator 114 includes a first gear 118 that is operatively connected to directional change gear 110 and second actuator 116 includes a second gear 120 that is operatively connected to directional change gear 110. As will be detailed herein, directional change motor 105 rotates first and second actuators 114 and 116 through drive shaft 108 to selectively raise and lower third and fourth drive members 54 and 56. In an embodiment, first drive member 20, second drive member 22, third drive member 54, and fourth drive member 56 may include magnets (not separately labeled) that secure bi-directional robotic crawler 10 to a surface.

Figure 5:
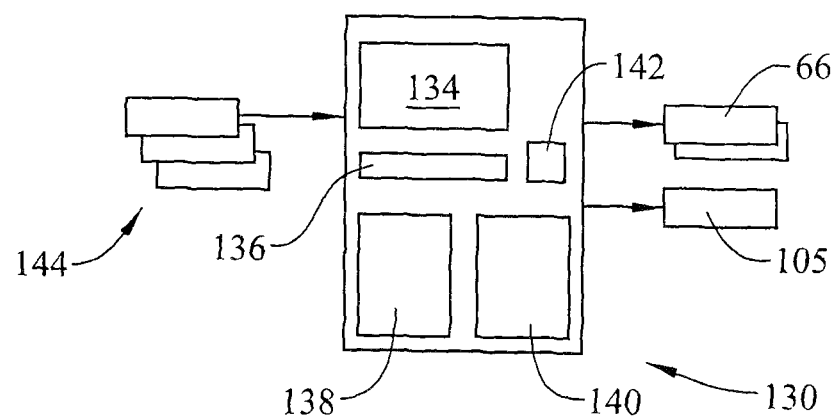
FIG. 5 is a block diagram illustrating a command and control module of the bi-directional robotic crawler, in accordance with an exemplary embodiment.

Reference will now follow to FIG. 5 in describing a command and control module 130 mounted to first drive system 14. Command and control module 130 includes a central processor unit (CPU) 134 and a non-volatile memory 136 that may include stored operating instructions for bi-directional robotic crawler 10. Non-volatile memory 136 may also include storage for parameters sensed by bi-directional robotic crawler 10. Command and control module 130 may also include a communication module 138, a drive module 140, and a sensor module 142. At this point, it should be understood, that drive motor 66, directional change motor 105, and control module 142 may be configured for underwater applications.

Communication module 138 may provide for wired and/or wireless communications to and from bi-directional robotic crawler 10. Drive module 140 may be connected to drive motor 66 and directional change motor 105. Drive module 140 may control a direction of travel along the first and/or second directions in response to instructions received through communication module 138 or based on pre-programmed instructions stored in non-volatile memory 136. Sensor module 142 communicates with one or more sensors 144 mounted to bi-directional robotic crawler 10 to detect parameters associated with a surface of interest 150. Sensors 144 may take on various formed depending upon what parameters are desired to be captured from surface of interest 150. Captured parameters may be stored in non-volatile memory 136 or communicated directly to an operator through communication module 138.

Figure 6:
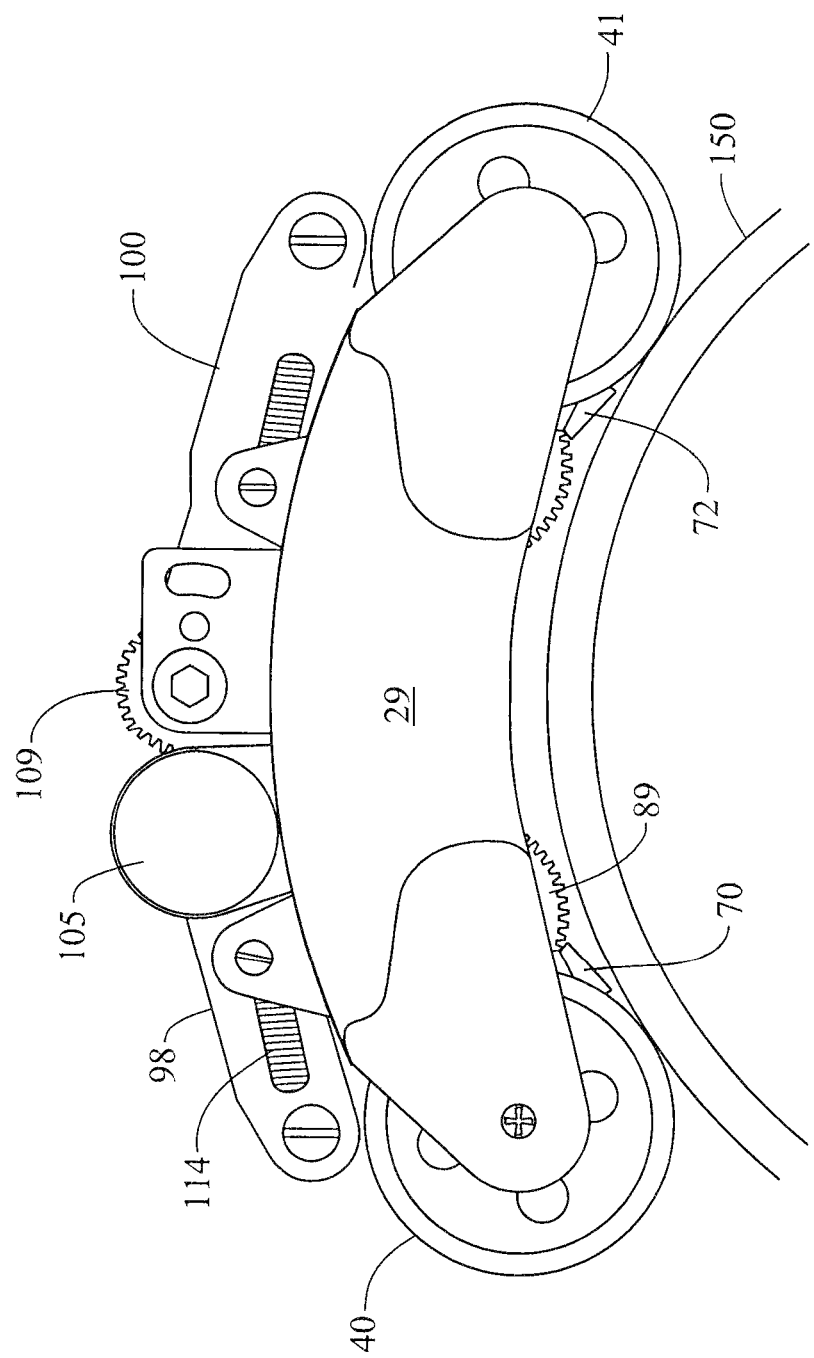
FIG. 6 is a frontal view of the bi-directional robotic crawler traversing a surface of interest in a first direction, in accordance with an exemplary aspect.

In accordance with an embodiment, command and control module 130 may signal directional change motor 105 to drive first and second linking portions 98 and 100 outwardly causing third and fourth drive members 54 and 56 to lift off of surface of interest 150. Of course, if third and fourth drive members 54 and 56 are already off of surface of interest 150, there is no need to operate directional change motor 105. When first and second drive members 20 and 22 are brought into contact with surface of interest 150 as shown in FIG. 6, drive module 140 may activate drive motor 66 to activate first pair of wheels 32 and second pair of wheels 38 to motivate bi-directional robot crawler 10 circumferentially about surface of interest 150 in the first direction. While traveling in the first direction, sensors 144 may detect various parameters associated with surface of interest 150.

Figure 7:
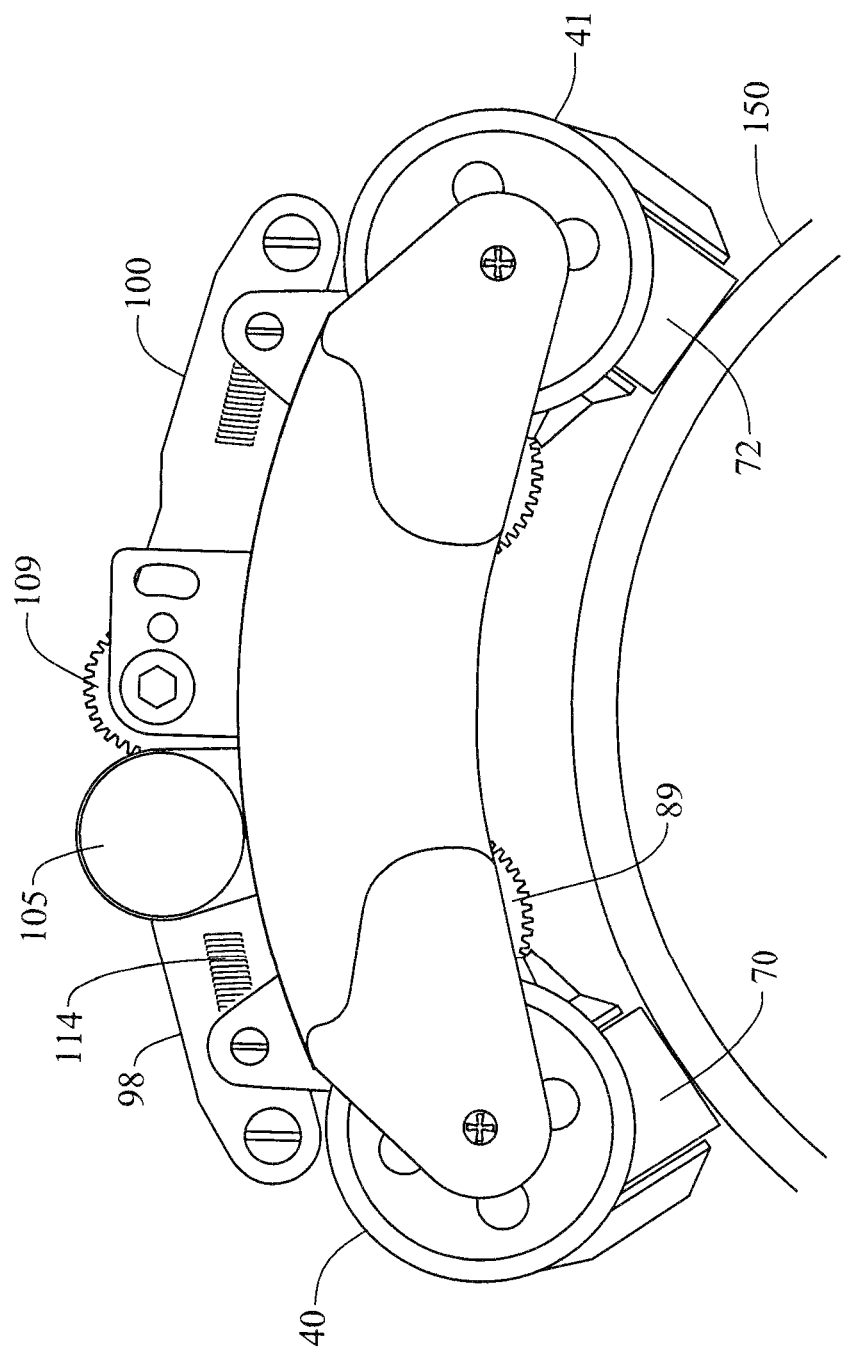
FIG. 7 is a frontal view of the bi-directional robotic crawler traversing the surface of interest in a second direction, in accordance with an exemplary aspect.
Figure 8:
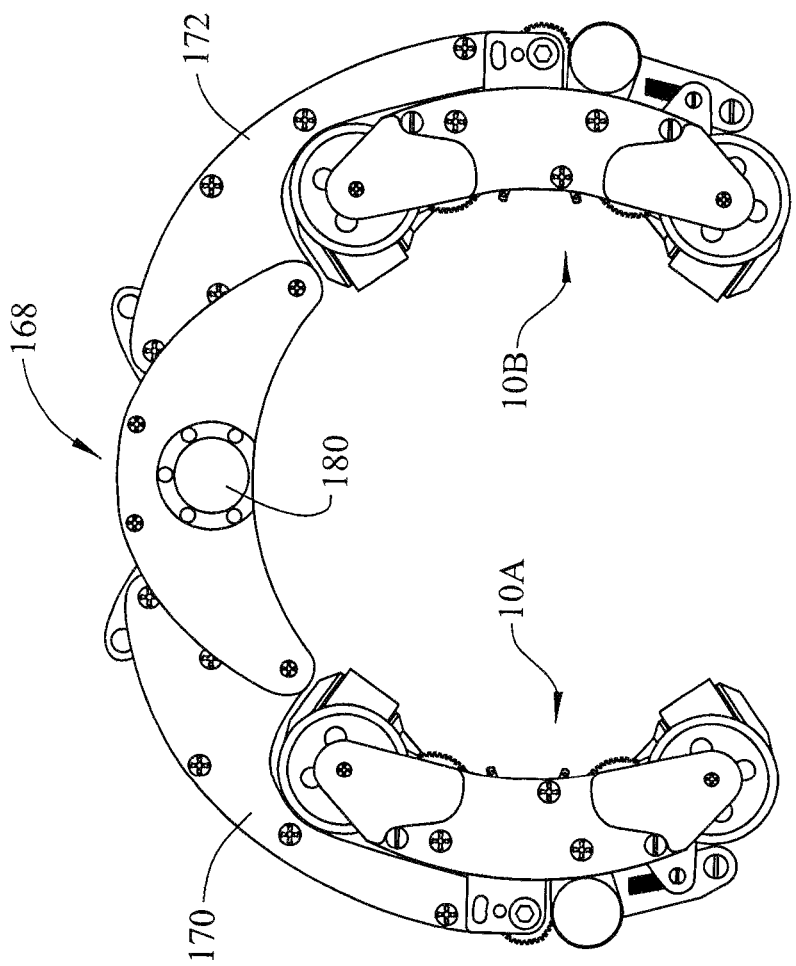
FIG. 8 is a frontal view of a robotic crawler system including a clamping mechanism linking a first bi-directional robotic crawler and a second bi-directional robotic crawler, in accordance with an exemplary embodiment.
Figure 9:
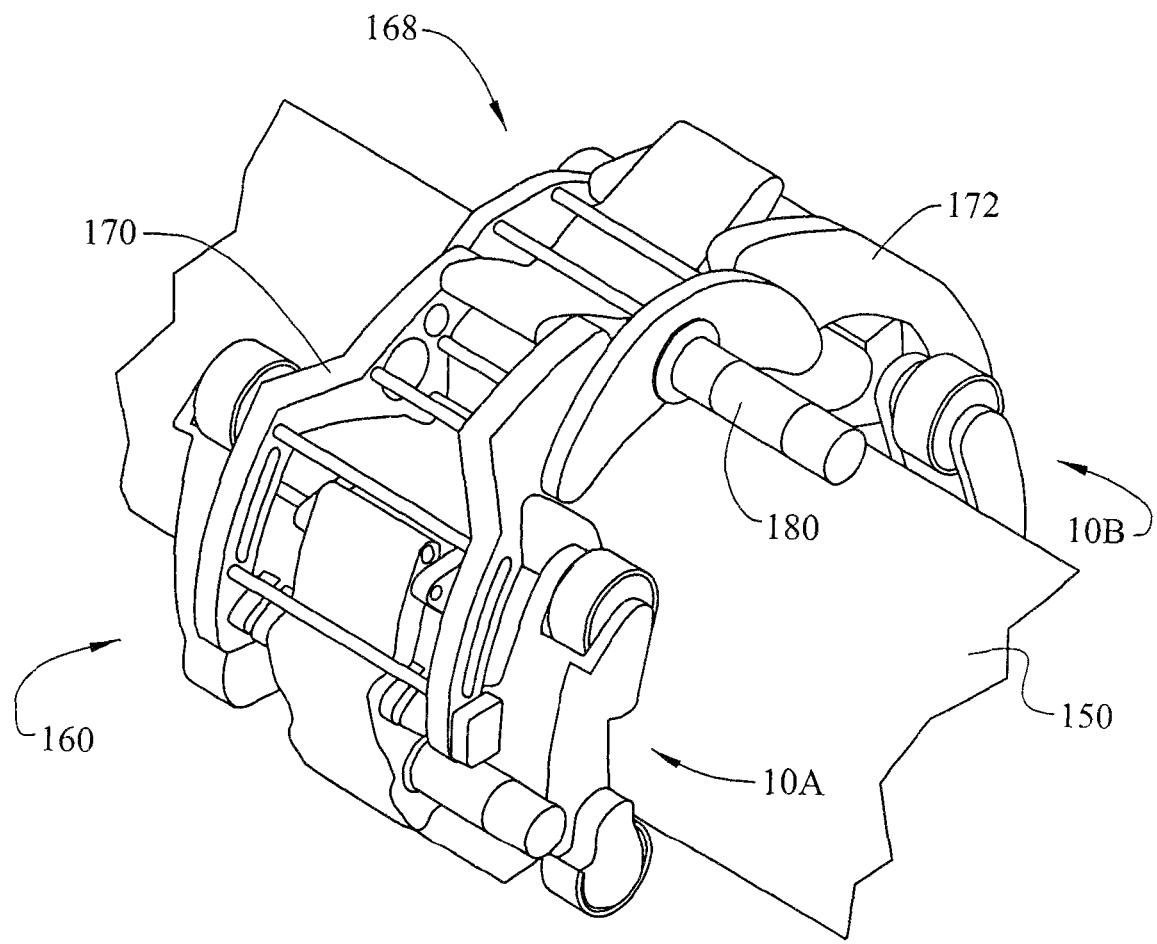
FIG. 9 is a perspective view of the robotic crawler system of FIG. 6 on a surface of interest, in accordance with an exemplary aspect.
Figure 10:
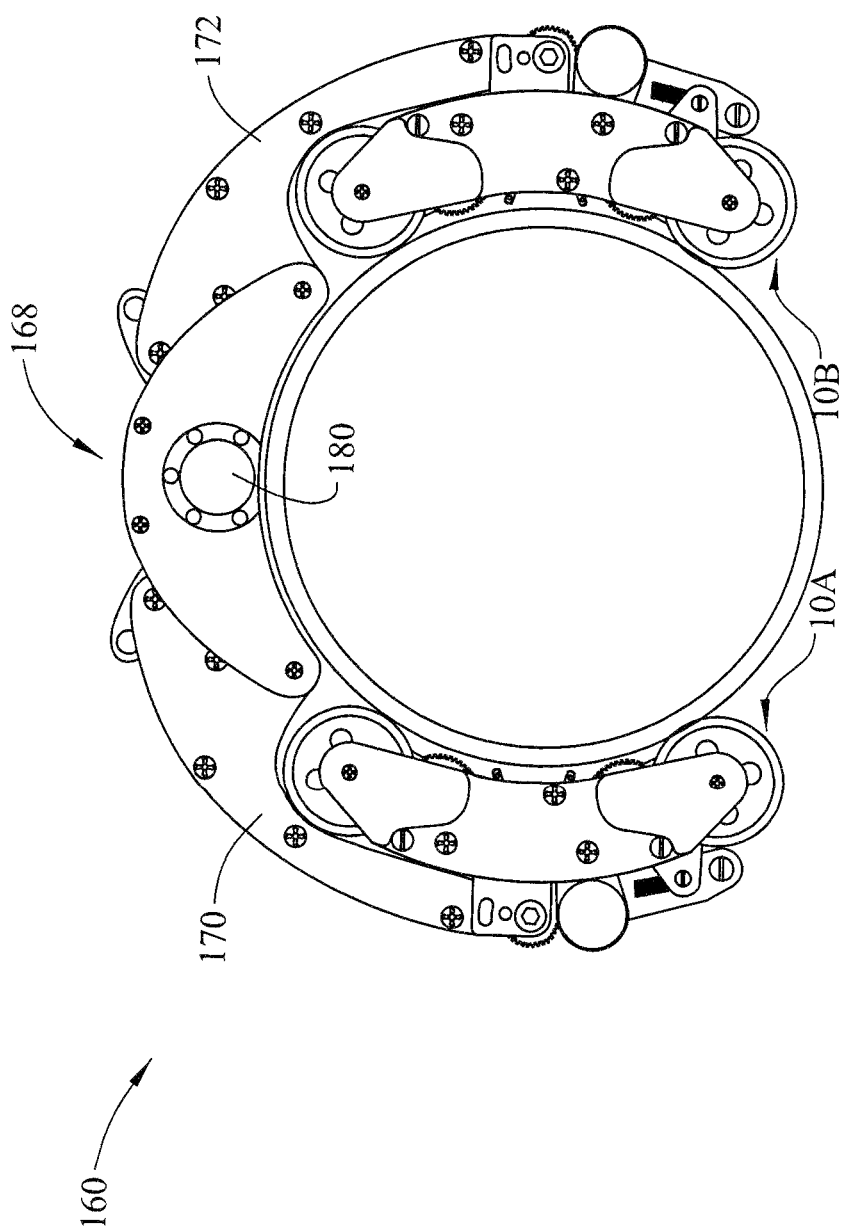
FIG. 10 is a frontal view of the robotic system of FIG. 6 traversing the surface of interest in the first direction, in accordance with an exemplary aspect.
Figure 11:
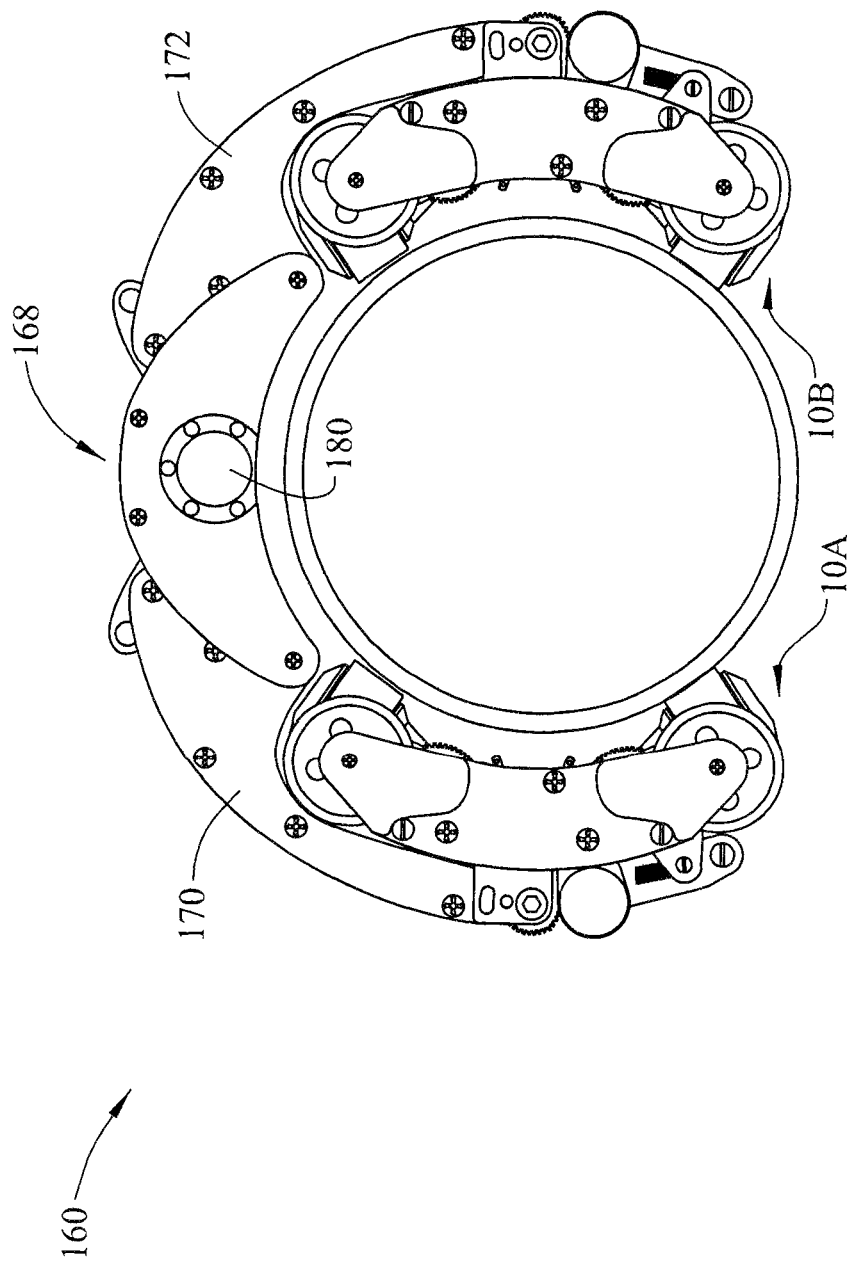
FIG. 11 is a frontal view of the robotic system of FIG. 6 traversing the surface of interest in the second direction, in accordance with an exemplary aspect.
Figure 12:
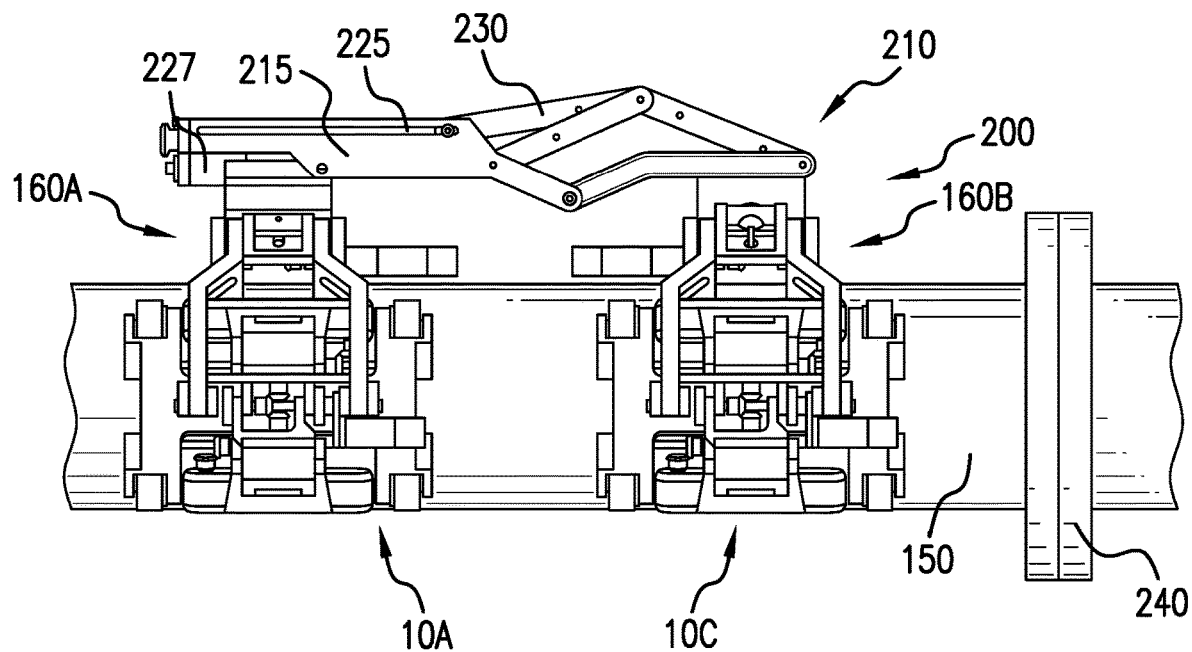
FIG. 12 depicts dual robotic crawler systems joined by a linkage approaching a flange, in accordance with an aspect of an exemplary embodiment.

In an embodiment, command and control module 130 may direct drive module 140 to activate directional change motor 105 to contract first linking portion 98 and second linking portion 100 causing third and fourth drive members 54 and 56 to engage surface of interest 150. Further contraction of first and second linking portions 98 and 100 causes first and second drive members 20 and 22 to raise off of surface of interest 150 as shown in FIG. 7. At this point, drive module 140 may activate drive motor 66 to activate first drive element 59 and second drive element 64 to motivate bi-directional robot crawler 10 travel along surface of interest 150 in the first direction. While traveling in the first direction, sensors 144 may detect various parameters associated with surface of interest 150.

Reference will now follow to FIGS. 8-11 in describing a robotic crawler system 160 in accordance with an exemplary embodiment. Robotic crawler system 160 includes a first bi-directional robotic crawler 10A and a second bi-directional robotic crawler 10B that are connected through a clamping mechanism 168. A first clamping arm 170 extends from clamping mechanism 168 and connected with first bi-directional robotic crawler 10A and a second clamping arm 172 extends from second bi-directional robotic crawler 10B.

Clamping mechanism 168 includes a clamping motor 180 that drives first and second clamping arms 170 and 172 about corresponding pivot points (not separately labeled) to secure first bi-directional robotic crawler 10A and second bi-directional robotic crawler 10B to surface of interest 150. With this arrangement, the drive systems for reach of the first and second bi-directional robotic crawler 10A and 10B may not include magnets. Gripping force holding first and second bi-directional robotic crawler 10A and 10B to surface of interest 150 may be provided by clamping mechanism 168. Clamping mechanism may also include a selectively deployable magnet (not show) that may selectively provide an attachment force securing robotic crawler system 160 to surface of interest 150.

Reference will follow to FIGS. 12-15 wherein like reference numbers represent corresponding parts in the separate views, in describing a dual robotic crawler system 200 in accordance with an exemplary embodiment. Dual robotic crawler system 200 includes a first robotic crawler system 160A and a second robotic crawler system 160B that are joined by a linkage 210. Linkage 210 includes an actuator 215 including a lead screw 225 connected to a motor 227. Motor 227 may selectively rotate to shift a bar 230 causing one of the first robotic crawler system 160A and the second robotic crawler system 160B to raise off of surface of interest 150.

Figure 13:
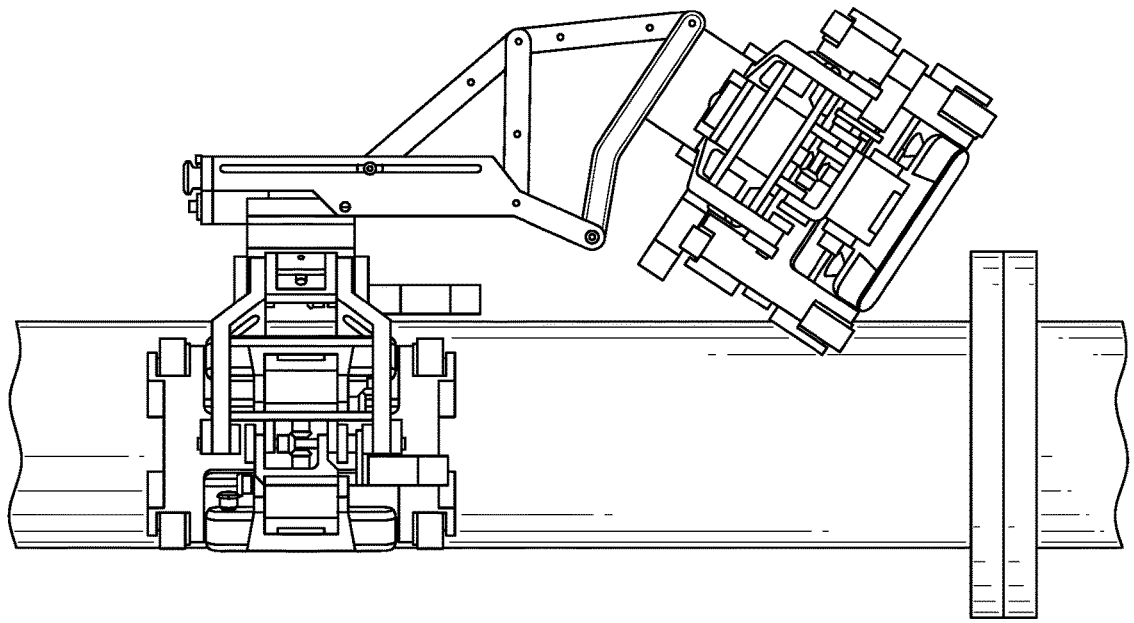
FIG. 13 depicts a first one of the dual robotic crawler system lifting a second one of the dual robotic crawler system, in accordance with an exemplary aspect.

In an embodiment, first robotic crawler system 160A and second robotic crawler system 160B may approach a flange 240 disposed along surface of interest 150. At this point, first robotic crawler system 160A may clamp first bi-directional robotic crawler 10A and a second bi-directional robotic crawler 10B to surface of interest 150. Second robotic crawler system 160B may release a third bi-directional robotic crawler 10C and a fourth bi-directional robotic crawler (not shown) from surface of interest 150. At this point, motor 227 may shift bar 230 causing second robotic crawler system 160B away from surface of interest 150 as shown in FIG. 13.

Figure 14:
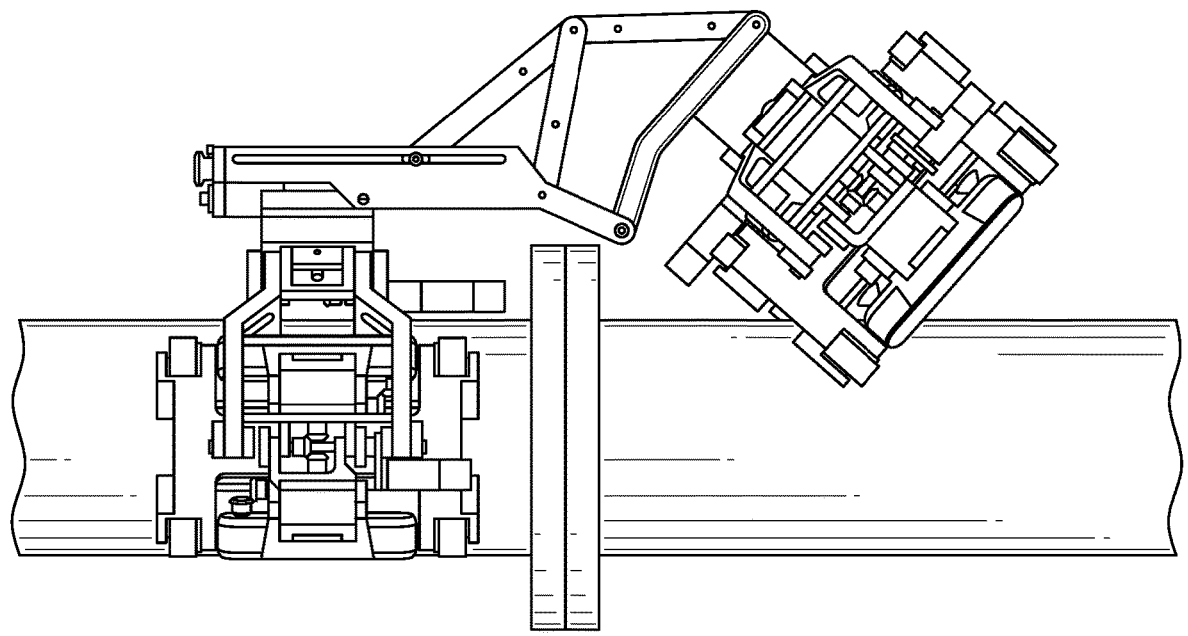
FIG. 14 depicts the first one of the dual robotic crawler system carrying the second one of the dual robotic crawler system over a flange provided along the surface of interest, in accordance with an aspect of an exemplary embodiment.
Figure 15:
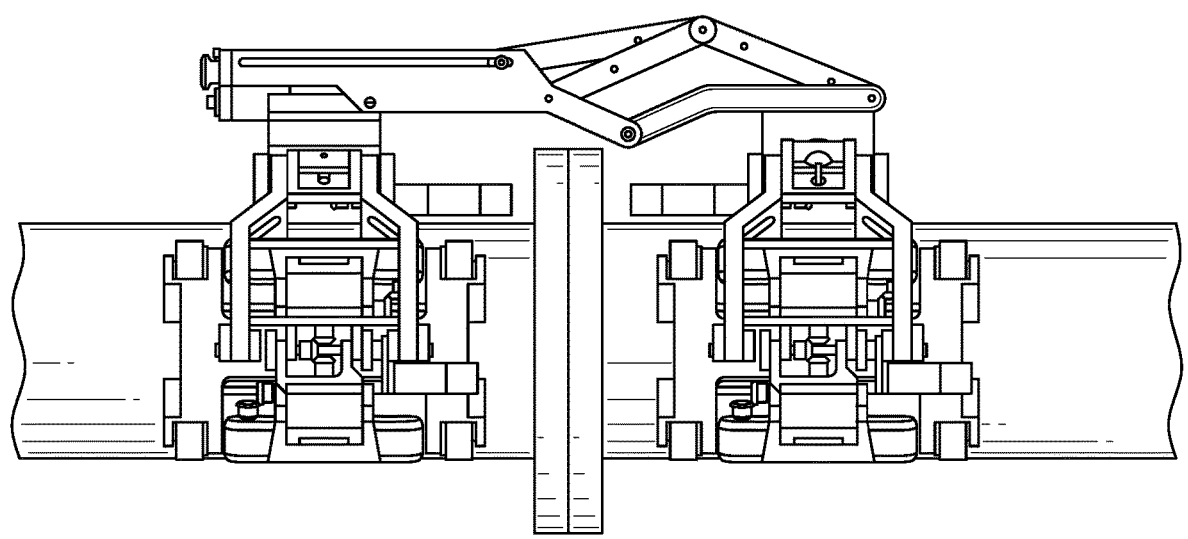
FIG. 15 depicts that first one of the robotic crawler system positioning the second one of the robotic crawler system on the surface of interest after the flange, in accordance with an exemplary aspect.
Figure 16:
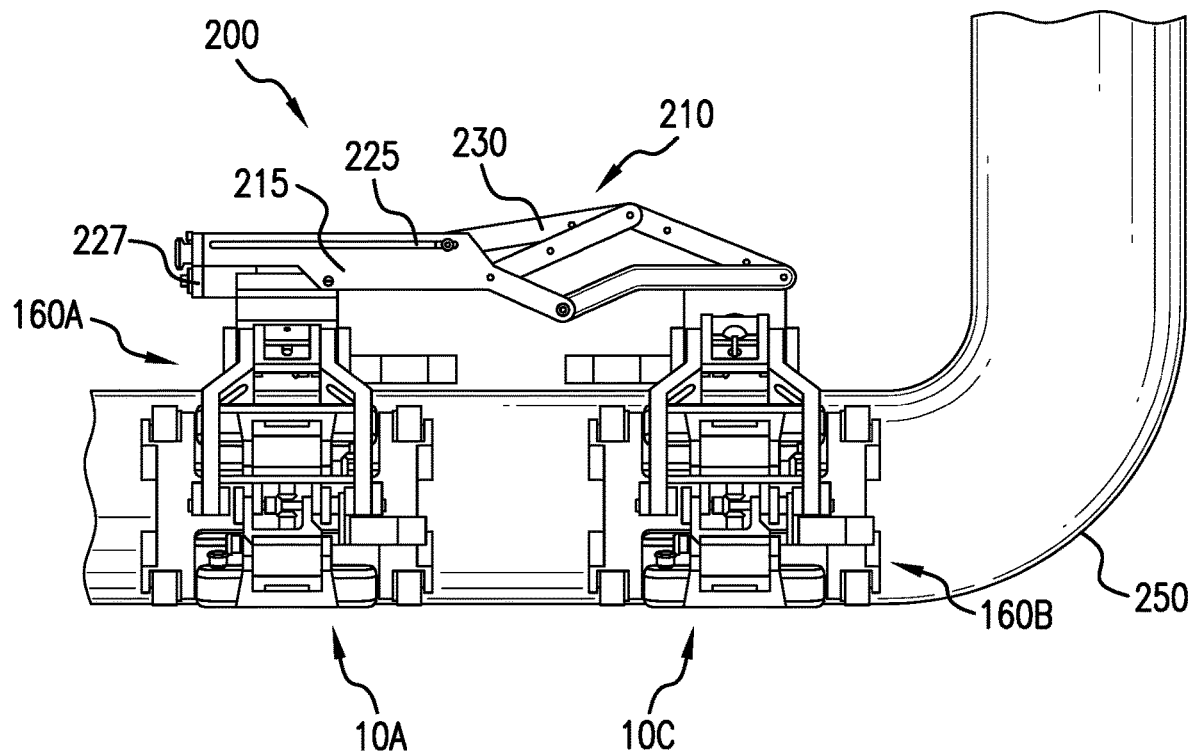
FIG. 16 depicts the dual robotic crawler system approaching a bend in the surface of interest, in accordance with an aspect of an exemplary embodiment.
Figure 17:
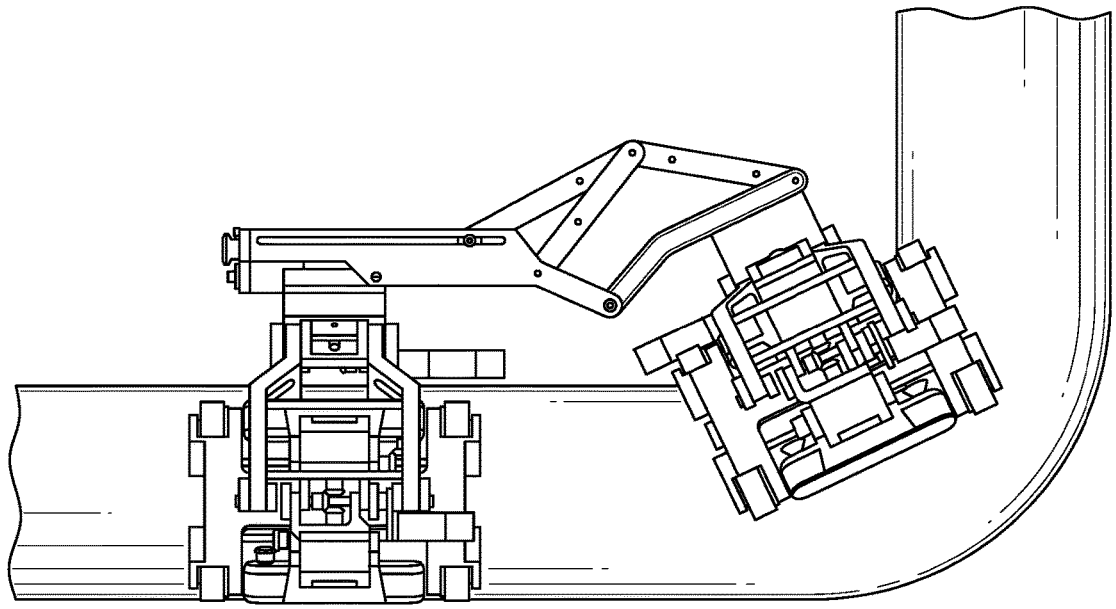
FIG. 17 depicts the first one of the dual robotic crawler system lifting the second one of the dual robotic crawler system over the bend, in accordance with an aspect of an exemplary embodiment.
Figure 18:
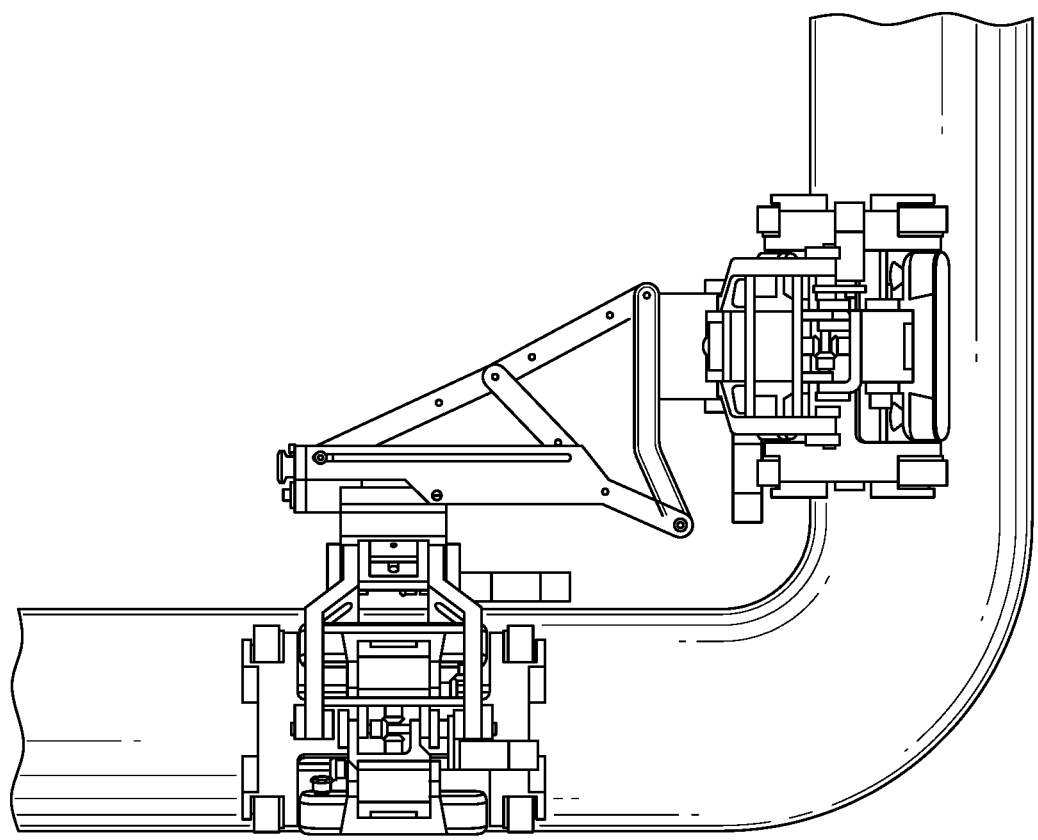
FIG. 18 depicts that first one of the robotic crawler system positioning the second one of the robotic crawler system on the surface of interest after the bend, in accordance with an exemplary aspect.

First robotic crawler system 160A may move along surface of interest 150 such that second robotic crawler system 160B passes over and beyond flange 240 as shown in FIG. 14. Motor 227 may then shift bar 230 to lower second robotic crawler system 160B back onto surface of interest 150 as shown in FIG. 15. The process may then be reversed to carry first robotic crawler system 160A over flange 240. Dual robotic crawler system 200 may also be employed in a similar manner to pass across a bend or elbow, as shown in FIGS. 16-18.

At this point, it should be understood that the exemplary embodiments describe a crawler that may traverse a surface of interest in two generally orthogonal directions. The crawler may include sensors that detect parameters of the surface of interest. The parameters may be communicated back to a controller in real-time or stored in memory for later retrieval. The crawler may be secured to the surface of interest through magnets, a clamping mechanism or simply gravity. Further, the crawler may be controlled directly through a wired or wireless connection or through stored program instructions. Finally, it should be understood that the general design of the crawler enables traversal of various obstacles, such as brank conduits, valves and the like.

The terms "about" and "substantially" are intended to include the degree of error associated with measurement of the particular quantity based upon the equipment available at the time of filing the application. For example, "about" and "substantially" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed but will include all embodiments falling within the scope thereof.

What is claimed is:

1. A bi-directional robotic crawler comprising:
   a first drive system including a first drive member, a second drive member and a support member extending therebetween, the first drive member including a first pair of wheels and the second drive member including a second pair of wheels, the first and second pairs of wheels being rotatable to shift the bi-directional robotic crawler along a first axis;
   a second drive system mounted to the first drive system, the second drive system including a third drive member operably coupled to a first side of the support member, and a fourth drive member operably coupled to a second, opposing side of the support member, the third drive member being configured to shift the bi-directional robotic crawler along a second axis that is angled relative to the first axis;
   a linking member connected to the third drive member and the fourth drive member across the support member;
   a motor mounted to the first drive system, a first motor coupled to the third drive member and a second motor coupled to the fourth drive member, the motor being configured to move the bi-directional robotic crawler along the second axis;
   a directional change motor operably connected to the linking member, the directional change motor configured to selectively position the first pair of wheels and the second pair of wheels in contact with a surface; and
   a first axle extending between the first and second drive members on the first side of the support member, the first axle having a first end supporting a first gear element and a second end supporting a second gear element, the first gear element being operatively connected to one of the first pair of wheels and the second gear element being operatively connected to one of the second pair of wheels.

2. The bi-directional robotic crawler according to claim 1, wherein the directional change motor selectively pivoting the linking member between a first configuration wherein the first pair of wheels and the second pair of wheels are in contact with a surface, and a second configuration wherein the first pair of wheels and the second pair of wheels are spaced from the surface.

3. The bi-directional robotic crawler according to claim 2, wherein the motor includes a first motor arranged in the third drive member and a second motor arranged in the fourth drive member.

4. The bi-directional robotic crawler according to claim 3, further comprising:
   a second axle extending between the first and second drive members on the second, opposing side of the support member, and the second axle supporting a second gear connected to the second motor; and
   wherein the first axle supports a first gear connected to the first motor.

5. The bi-directional robotic crawler according to claim 4, wherein the first gear element is arranged in the first drive member and the second gear element is arranged in the second drive member.

6. The bi-directional robotic crawler according to claim 4, wherein the linking member includes a first linking portion operatively connected to the third drive member and a second linking portion operatively connected to the fourth drive member, the first and second linking portions being pivotally connected to the support member.

7. The bi-directional robotic crawler according to claim 6, further comprising: a drive shaft including a directional change gear extending through the first linking portion and the second linking portion, the drive shaft being drivingly connected to the directional change motor.

8. The bi-directional robotic crawler according to claim 7, further comprising: a first actuator extending though the first linking portion and a second actuator extending through and operatively connected to the second linking portion, the first actuator including a first gear operatively connected to the directional change gear and the second actuator including a second gear operatively connected to the directional change gear.

9. The bi-directional robotic crawler according to claim 1, wherein the third drive member comprises a first continuous drive belt and the fourth drive member comprises a second continuous drive belt.

10. The bi-directional robotic crawler according to claim 1, further comprising: a sensor system mounted to the first drive system, the sensor system including one or more sensors configured to detect parameters of a surface of interest.

11. The bi-directional robotic crawler according to claim 1, wherein each of the first drive member, second drive member, third drive member, and fourth drive member includes a magnet configured to secure the bi-directional robotic crawler to a surface.

12. A bi-directional robotic crawler system, comprising:
   a first bi-directional robotic crawler according to claim 1;
   a second bi-directional robotic crawler according to claim 1; and
   a clamping mechanism operatively connected to the first bi-directional robotic crawler and the second bi-directional robotic crawler, the clamping mechanism including a first clamping arm coupled to the first bi-directional robotic crawler, a second clamping arm coupled to the second bi-directional robotic crawler, and a clamping mechanism operatively connected to the first clamping arm and the second clamping arm.

13. The bi-directional robotic crawler system according to claim 12, further comprising: a clamping motor mounted to the clamping mechanism, the clamping motor selectively shifting the first clamping arm about a first pivot and the second clamping arm about a second pivot.

14. The bi-directional robotic crawler system according to claim 12, further comprising: a sensor system mounted to the clamping mechanism.

15. The bi-directional robotic crawler system according to claim 14, wherein each of the first drive member, second drive member, third drive member, and fourth drive member of the first bi-directional robotic crawler includes a first magnet configured to secure the first bi-directional robotic crawler to a surface.

16. The bi-directional robotic crawler system according to claim 15, wherein each of the first drive member, second drive member, third drive member, and fourth drive member of the second bi-directional robotic crawler includes a second magnet configured to secure the second bi-directional robotic crawler to the surface.

* * * * *